Jan. 3, 1967　　　R. G. CONARD ETAL　　　3,295,324
ROCKET MOTOR CASE VENT SYSTEM
Filed June 10, 1964　　　　　　　　　　　2 Sheets-Sheet 1
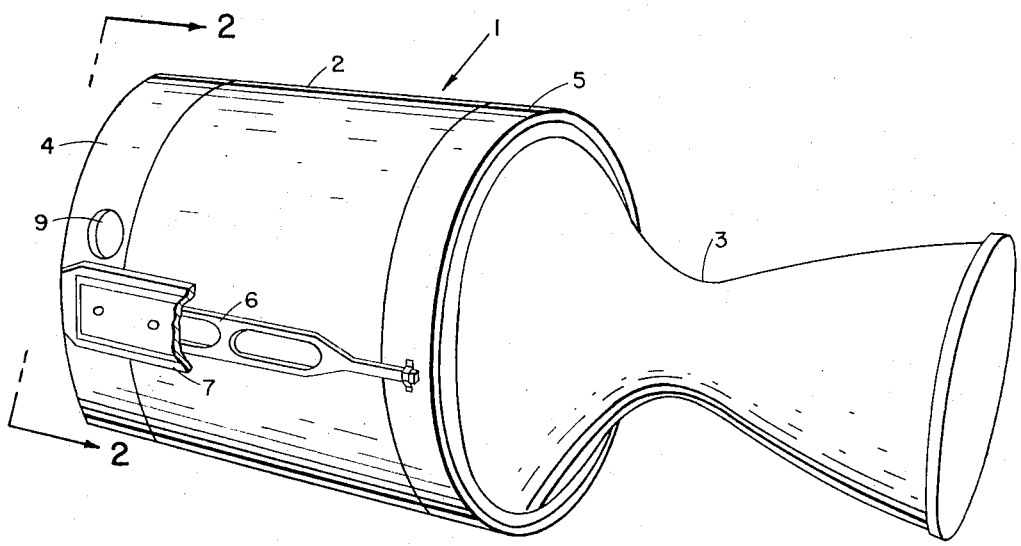
FIG. I
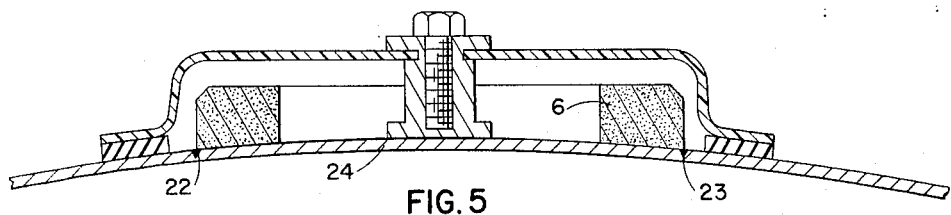
FIG. 5
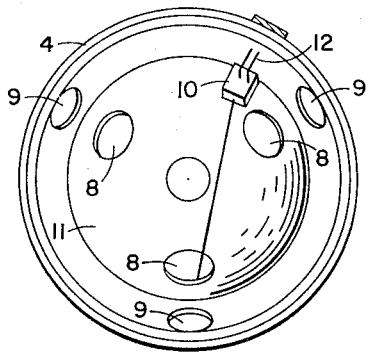
FIG. 2
Robert G. Conard
Raymond A. Deep
Thomas N.L. Pughe
Howard H. Henriksen
William E. Thomas,
　　　　　INVENTORS.

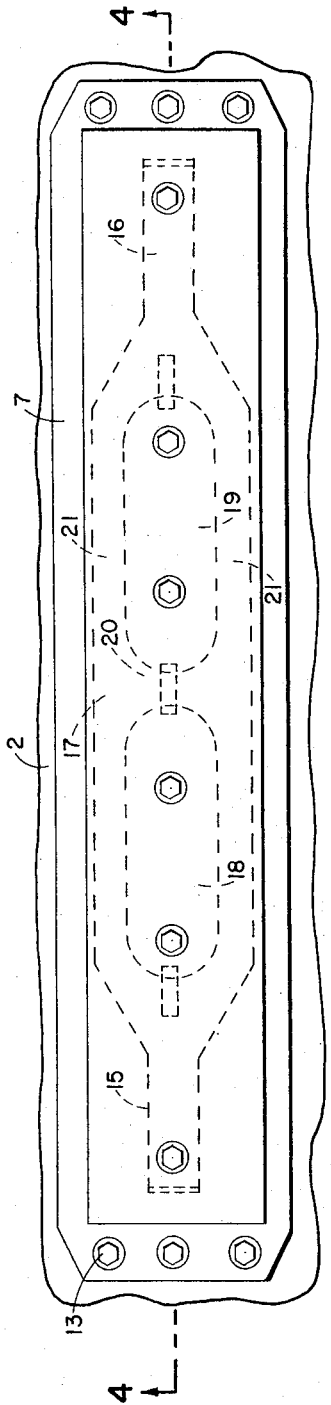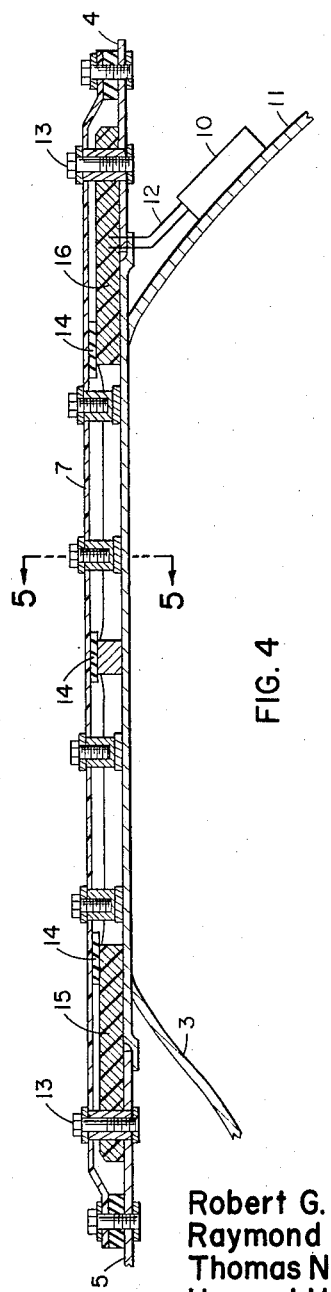

United States Patent Office
3,295,324
Patented Jan. 3, 1967

3,295,324
ROCKET MOTOR CASE VENT SYSTEM
Robert G. Conard, Raymond A. Deep, Thomas N. L. Pughe, Howard H. Henriksen, and William E. Thomas, Huntsville, Ala., assignors to the United States of America as represented by the Secretary of the Army
Filed June 10, 1964, Ser. No. 374,213
5 Claims. (Cl. 60—254)

The invention described herein may be manufactured and used by or for the Government for governmental purposes without the payment of any royalty thereon.

The present invention relates to a system for venting the combustion chamber of a rocket motor to the ambient atmosphere at a precisely predetermined time.

It is contemplated that the present invention is a solution to the problem commonly referred to as warhead wobble which is encountered in certain multi-stage missile systems now in use. In these missile systems a reverse thrust is applied to the final stage to effect separation of the final stage from the warhead. This thrust is provided by opening ports in the forward portion of the combustion chamber thus allowing a portion of the thrust to be applied in a forward direction. This reversed thrust immediately decelerates the rocket motor moving it away from the warhead which continues toward its target. It has been found that the reversed thrust of this type rocket motor results in thrust plumes or shock waves which completely surround the warhead thus causing aerodynamic instability of the warhead. The present invention eliminates this problem by creating openings of predetermined size and location in the combustion chamber of the rocket motor at precisely the correct instant thereby reducing the forward thrust to a minimum and eliminating the instability of the warhead.

Accordingly, it is an object of this invention to provide a means for abrupt and well-timed interruption of the reverse thrust of a rocket motor.

A further object of this invention is to provide a dependable and easily controlled device for venting the combustion chamber of a rocket motor to the ambient atmosphere at a predetermined time while yet maintaining the structural integrity of the rocket motor during the period when it is in the proximity of the reentry body.

Still another object of this invention is to provide a rocket motor venting system which is relatively simple to install on motors presently in use and which is inexpensive to produce.

This invention together with other objects and advantages hereof will be best understood by reference to the following description and accompanying drawings in which:

FIGURE 1 is a perspective view of a rocket motor equipped with a shielded solid type explosive charge, the shield of which is partially cut away for purposes of clarity.

FIGURE 2 is a view of the forward portion of the rocket motor of FIGURE 1 showing its reverse thrust ports and the general configuration of the thrust chamber.

FIGURE 3 is a plan view of the shield which covers the solid explosive charge, the charge being shown in phantom.

FIGURE 4 is a cross section taken on lines 4—4 of FIGURE 3.

FIGURE 5 is a cross section taken on lines 5—5 of FIGURE 4.

Referring now to FIGURE 1, a rocket motor 1 consists of a combustion chamber structure 2, a nozzle portion 3, a forward case extension 4 and a rearward case extension 5. A solid explosive charge 6 is rigidly mounted on the outer surface of the combustion chamber structure. Surrounding and protecting the charge from excessive aerodynamic heating is a shield 7 which is also attached to the wall of the combustion chamber structure. Shield 7 is not essential to the operation of the device and may be dispensed with in some instances depending upon the type of material used to fabricate the charge and the use for which the missile is intended. As best shown in FIGURE 2, the forward portion of the combustion chamber structure consists of a dome having three reverse thrust ports 8 positioned around its periphery. These ports are closed during flight except at the instance of separation of the rocket motor from the warhead at which time the ports are opened either by actuation of explosive retaining sectors or similar means. Opening of these ports allows the pressure within the combustion chamber structure to be exerted in a forward and outward direction thru case openings 9 which are formed in forward case extension 4 of the motor. This sudden release of the high pressure combustion gases results in an instantaneous reverse thrust of considerable magnitude. The reverse thrust gases create a shock wave structure which envelopes the warhead and causes serious aerodynamic instability.

A charge igniter 10 is shown positioned on forward wall 11 of the combustion chamber structure. It is attached by bolts or other satisfactory mounting means. A pair of igniter leads 12 connect the igniter to charge 6.

Referring now to FIGURE 3, charge shield 7 is attached to the wall of combustion chamber structure 2 by means of a series of bolts 13. The general shape and location of the charge is shown in phantom. Studies have indicated that a charge having a generally rectangular configuration is most effective. It has also been determined that the charge must be positioned longitudinally of the motor to insure best results.

FIGURE 4 is taken on lines 4—4 of FIGURE 3 and illustrates the linear cross section of the charge as it is mounted on the combustion chamber structure and also illustrates more clearly the forward and rearward extensions 4 and 5 respectively. The arrangement of igniter 10 and its leads 12 is also shown in respect to forward wall 11 of the combustion chamber structure. It will be noted that shield retainer bolts 13 at either end of shield 7 pass through and retain end portions 15 and 16 of the charge. A series of pads 14 provide an additional means of maintaining the charge in direct and rigid contact with the wall of the combustion chamber structure.

As is best shown in FIGURE 3, middle portion 17 of charge 6 is appertured at 18 and 19 and reinforced by a center cross portion 20. It will be noted that contacting edge portion 21 of the center portion are approximately the same width as the end portions 15 and 16 thus providing a uniform amount of explosive material along the outer edge of the entire charge. It will be noted by referring to FIGURE 5 that the wall portion of the combustion chamber structure may be partially grooved or weakened as at 22 and 23 so as to provide a definite cutting line along which portion 24 of the combustion wall may be separated upon ignition of the charge. It will be apparent that because of the great internal pressure within the combustion chamber that portion 24 will be immediately blown to the exterior rather than to the interior of the motor.

In operation, a predetermined time after opening of the reverse thrust ports 8 of the igniter 10 will actuate or fire the charge 6 thus venting the combustion chamber structure to the ambient atmosphere by removal of portion 24. Venting of the combustion chamber structure to such a great extent will not only immediately eliminate the reverse thrust in the motor as well as the shock wave structure which it creates, it will also destroy the forward thrust of the warhead. It is also apparent that the reverse thrust need not be of such magnitude as was before necessary, since no forward thrust remains to be overcome. The positioning and shape of the charge 6 is quite critical and as indicated in FIGURE 5, the charge conforms to the curvature of the wall of the combustion chamber structure. It is also quite important that the charge be rigidly attached to the wall of the combustion chamber structure. The charge may be bolted or attached by other suitable means.

While the foregoing is a description of the preferred embodiment, the following claims are intended to include those modifications and variations that are within the spirit and scope of our invention.

We claim:

1. A rocket motor case vent system comprising: a rocket motor having a combustion chamber defined by a lateral wall and a closed end portion; a nozzle portion opposite said closed end portion and attached to said wall; a generally rectangular explosive charge attached to and contacting the exterior of said wall and extending lengthwise thereof, said charge comprises a center portion and a pair of relatively slender portions attached to either end of said center portion, said center portion having a plurality of apertures therein being so located and shaped as to concentrate the contacting explosive material of the center portion along its lateral edges, said center portion being relatively wide as compared to said end portions; and means for igniting said explosive charge thereby effecting penetration and removal of a portion of said chamber wall so as to vent said combustion chamber to the ambient atmosphere.

2. A device as set forth in claim 1 wherein said charge is of such concentration and shape as to remove a portion of the combustion wall approximately the size and shape of said charge.

3. A device as set forth in claim 2 wherein the wall of said combustion chamber is weakened along predetermined lines so as to precisely control the size and shape of the portion of said combustion wall to be removed by said explosive charge.

4. A device as set forth in claim 3 wherein said explosive is contoured to conform to the shape of the exterior of said combustion chamber wall.

5. A device as set forth in claim 4 wherein the width of the lateral contacting edges of said center portion of said explosive charge are approximately the same width as that of the end portions.

References Cited by the Examiner

UNITED STATES PATENTS

| 2,478,958 | 8/1949 | Wheeler et al. | 102—49 |
| 2,937,595 | 5/1960 | Margulis et al. | 60—35.6 |
| 3,180,264 | 4/1965 | Webb | 102—49 |

CARLTON R. CROYLE, *Primary Examiner.*

SAMUEL FEINBERG, *Examiner.*